Nov. 16, 1965   N. E. HAGER, JR   3,217,537

METHOD AND APPARATUS FOR DETERMINING SPECIFIC HEAT

Filed Feb. 25, 1963

*INVENTOR.*
NATHANIEL E. HAGER, JR.

3,217,537
METHOD AND APPARATUS FOR DETERMINING SPECIFIC HEAT

Nathaniel E. Hager, Jr., Manheim Township, Lancaster County, Pa., assignor to Armstrong Cork Company, Lancaster, Pa., a corporation of Pennsylvania
Filed Feb. 25, 1963, Ser. No. 260,800
8 Claims. (Cl. 73—190)

This invention relates generally to calorimeters, and more particularly to calorimeters for determining the specific heat of materials. Still more particularly, the invention relates to a calorimetric device for determining the specific heat of materials in the form of one or more flexible thin layers or films at elevated temperatures which have hitherto defied accurate specific heat determinations. The invention also relates to a method of making specific heat determinations on such materials.

There are two principal classical methods for measuring the specific heat of solids:

(1) Static method: The equilibrium temperature of a sample is noted before and after a known quantity of heat is exchanged between the sample and its surroundings. Most commonly this method is carried out in a calorimeter, using the "method of mixtures."

(2) Dynamic method: The rate of change of temperature of a sample is observed while it is being heated by thermal energy applied at a known rate.

When the sample has low thermal conductivity such as found in a plastic, it becomes very difficult to use either of these methods to get precise specific heat values at any specified temperature. Because of low conductivity, the plastic requires a long time to reach equilibrium in the static method, and the plastic must be heated excessively slowly to prevent large gradients in the dynamic method. In either case it becomes necessary to use elaborate adiabatic enclosures to keep heat losses low enough so that accurate results can be obtained.

If the specific heat is to be determined within a narrow temperature range so that the sample must undergo only a small change during the test, the situation becomes even more critical, and the requirements become even more exacting. In fact no evidence has been found that precise measurements have been made of the specific heat of plastics as a well-defined function of temperature. Measurements usually reported are average values determined over a wide range of temperature such as those between the boiling point of water and room temperature.

The method to be described here has shown that the specific heat of at least one plastic changes sharply with temperature within a region of 20° F. and this change would be practically obscured if the measurement were averaged over a hundred or more degrees.

Additionally, all the difficulties are magnified at high or low temperatures. As an indication of the difficulty of measuring specific heat of common substances at temperatures other than normal ambient temperatures, there do not appear to be any published data on the specific heat of poly(vinyl chloride) for the entire temperature range of minus 100° F. to plus 300° F. Values are usually given at some unspecified temperature which probably lies between room temperature and the boiling point of water. Hence there is a need for a calorimeter capable of yielding accurate results, and for a method of determining the specific heat of solids and liquids easily and accurately at any specific temperature within a wide temperature range.

It is the primary object of the present invention to supply such a calorimeter and such a process. It is a further object of the present invention to supply a calorimeter and a process which will allow accurate determination of the specific heat of a wide variety of materials over an extraordinarily wide temperature range.

These objects are accomplished in a surprisingly straightforward and effective manner. The invention contemplates determining the specific heat of a material by utilizing the material in the form of a flexible thin layer. The thin layer in the form of a uniform film or homogeneous layer of particles having a known weight per unit area is placed on a flexible, uniformly thin, metallic foil, resistance heater of known specific heat and weight per unit area. The layer of material to be tested and the foil heater with which it is in contact are then stacked in an array, or rolled or folded to form a roll like a jelly-roll wherein the layers and the heater are in physical contact throughout the opposing, face-to-face area they have in common. This arrangement produces a system equivalent to a sample with the heater distributed throughout its volume. Electrical current is then passed through the heater at a measured rate to raise the temperature of the heater and the layers. The rate of temperature rise in the interior of the roll is measured by means of suitable temperature sensing devices. With these data, it is then a simple matter to determine the specific heat, $c$, of the solid in the layer in B.t.u./lb.-F.° by means of the relationship (1)
$$c = \frac{\dfrac{Q}{A\left(\dfrac{dT}{dt}\right)} - Dc'l}{\dfrac{W}{w}}$$

wherein $$\frac{Q}{A}$$

is the heat generated per unit area of the heater in B.t.u./hr.-ft.$^2$ as determined by the electrical power input, $$\frac{dT}{dt}$$

is the rate of rise of temperature of the layer in the interior of the calorimeter in F.°/hr., $D$ is the density of the foil heater metal in lb./ft.$^3$, $c'$ is the specific heat of the heater in B.t.u./lb.-F.°, $l$ is the thickness of the heater, and $$\frac{W}{a}$$

is the sample weight per unit area in lb./ft.$^2$ per unit area of the heater.

The present invention overcomes the prior problems of unwanted heat flow by heating the sample quickly throughout its volume instead of applying the heat from outside the system. This quick heating is accomplished by placing a layer of the sample and a metal foil heater together and preferably rolling or folding them up like a jelly-roll. A stacked array of alternate heaters and layers of sample may also be built up to use the same principle on nonflexible samples and on viscous liquids. The jelly-roll produces a cylindrical layer of sample which can be heated rapidly and uniformly by the foil heater with which it is in contact. By measuring the rate at which heat is applied to the heater and the rate of temperature rise of the composite heater plus sample at a depth within the roll of 0.25 to 0.50 inch, the specific heat of the solid can be readily determined. When the layer of the sample in the jelly-roll calorimeter is no thicker than about 20 mils, theory shows that samples of the common plastics can be heated quickly without bringing about a significant temperature difference within the layer to produce error, at least after a brief initial period. Experience shows that some samples can be as thick as 50 mils or more without causing serious error. The layer of material to be tested, whether it be in the form of film or a homogeneous layer of particles, should generally be no thicker than about 50 mils in order that the layer can be heated quickly and evenly through its thickness with no significant temperature difference throughout the thickness of the layer to produce an error. On the other hand, the layer ought to have a thickness of at least about 5 mils in order that the specific heat of the heater will not unduly affect the accuracy of specific heat readings of the layer being tested. The sample will preferably have a thickness in the range of 10–30 mils. Additionally, when the proble used to measure the temperature rise rate is planted deep enough within the roll, the necessary heating can be done rapidly enough so that during the early minutes of the run the effects of any heat loss from the surface of the jelly-roll cylinder do not have time to be felt within the body of the jelly-roll cylinder. The technique is to complete the run after passage of the initial period during which there are appreciable temperature differences across the sample layers and before the terminal period when effects are felt at the probe depth from the surface heat exchange. With .020 inch plastics, the data usually used are those taken after 15–30 seconds and before 90 seconds. The test is to use only those data taken during the period when temperature increases linearly with time.

In order to get accurate results, the heat capacity per unit area of the heater should be much less than that of the sample being tested. The heater must also be thick enough so that its thickness can be kept sufficiently uniform to produce heat at a uniform rate over its entire area. For these reasons, a thin flexible metal foil heater is uniquely well suited for this technique because it must have low heat capacity per unit area, and because it must produce uniform heating.

The invention will be better understood by reference to the drawings in which.

Figure 1:
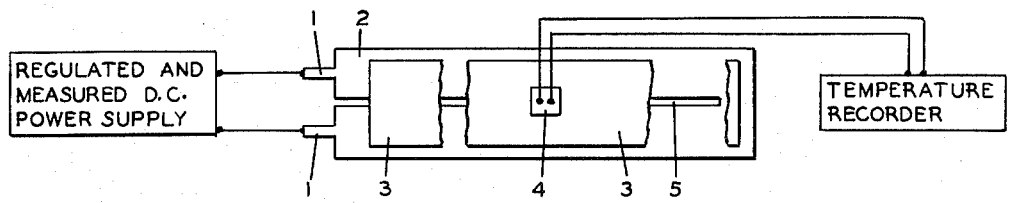
FIG. 1 is a simplified representation of one form of metal foil heater with attendant simplified electrical circuitry and a broken-away sample film prior to rolling into a jelly-roll.

Referring to FIG. 1, electrical connectors 1 are adapted to connect the thin flexible metallic foil serpentine resistance heater 2 to a regulated and measured direct current power supply. The sample film 3, show in FIG. 1 in broken form, is simply laid on top of the foil heater. The width of the heater may be chosen for convenience, although it has been found in practice that 2–6 inches is ample width for most purposes. A temperature sensing element 4 is positioned on the sample film 3 in order to measure the rate of temperature rise of the sample film while current is passing to the heater. The sensing element 4 should be more than 0.25 inch from the outer surface of the final roll, but not much more, so that the roll does not get too bulky. The temperature sensing element may conveniently be a thermocouple junction or a thermocouple platelet, or even a thermometer which will indicate the temperature without otherwise disturbing the heat flow in the system. In FIG. 1, the temperature sensing element 4 is shown connected to a temperature recorder. The gap 5 in the heater 2 separates the current-carrying elements in the serpentine heater 2.

Figure 2:
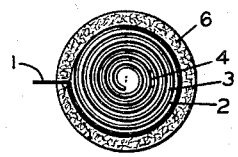
FIG. 2 represents the assembly of FIG. 1 rolled into a jelly-roll cylinder and having the wiring removed.

In FIG. 2, the assembly of FIG. 1 has been rolled into a jelly-roll or cylinder. The electric connectors 1, the foil heater 2, the sample layer 3, and the temperature sensing element 4 may all be encased, if desired, in a layer of glass wool insulation 6. The entire jelly-roll assembly may then be maintained intact by such simple means as a rubber band or piece of string. Inspection of FIG. 2 indicates the main reason for the successful operation of the calorimeter of the present invention. The jelly-roll assembly may be heated conveniently at a temperature rate of 5–10° per minute, while heat losses at the location of the temperature sensitive element 4 are minimized by the application of heat over the entire surface of the sample. Thus rapid and uniform heating is achieved throughout the thickness of the sample and throughout the inner layers of the roll where the temperature change is recorded.

Figure 3:
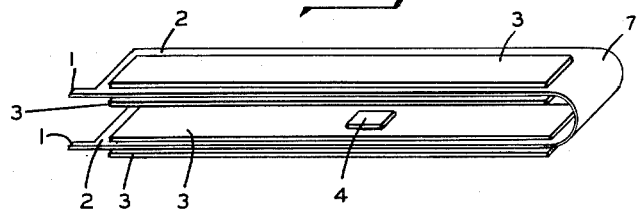
FIG. 3 is a simplified representation showing an alternate method of stacking layers of the heater and the plastic film before rolling into a cylinder.
Figure 4:
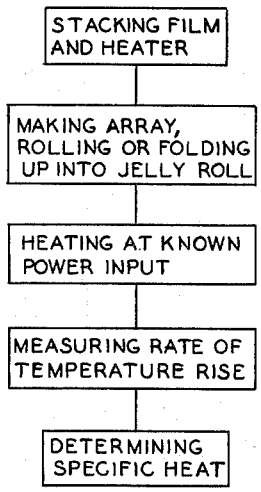
FIG. 4 represents the various steps in the method of the present invention.

Referring to FIG. 3, the electrical connectors 1 allow the passage of current down a single strip of flexible thin metallic foil which serves as the heater 2. It can be seen that the heater 2 is bent back on itself at the bend 7. Four layers of the sample 3 are interspersed around the doubled heater, and the temperature sensing element 4 is placed between the two interior layers of the sample 3 and is thus electrically insulated from the heater 2. This arrangement may be folded or rolled from the closed end 7 toward the electrical connectors 1 in order to form the jelly-roll calorimeter of the present invention having the electrical connectors conveniently exposed for connection to a power supply.

The invention is particularly adapted for measuring the specific heat of thermoplastics in the form of thin films over the entire range of temperatures the resin can withstand without degradation. The specific heats over a wide range of temperature have now been taken on films of such resins as polyethylene, poly(vinyl chloride), and poly(ethylene terephthalate). The values attained agreed well with the values listed in various handbooks for the limited range of temperature given in the handbooks. The precision of measurement is estimated to be within 2%.

If the material to be tested does not readily form a film, a thin homogeneous even layer may be deposited on another thin film coated with a pressure-sensitive or activated adhesive. Such a carrier film containing the sample adhered thereto will be treated in the normal manner in operation of the calorimeter. Correction will need to be made for the specific heat of the carrier film plus adhesive film. Accordingly, Equation 1 will be modified to read as follows:

(2)

$$c = \frac{\dfrac{Q}{A\left(\dfrac{dT}{dt}\right)} - Dc'l - D_1 c'_1 l_1 - D_2 c'_2 l_2 - \cdots D_n c'_n l_n}{\dfrac{W}{a}}$$

wherein the same designations in this Equation 2 have the same meanings as explained in Equation 1 and the subscripts 1, 2, . . . $n$ designate the $n$ carrier films and adhesive layers associated with a unit area of the heater. Specific heats of viscous liquids may be determined in an array of heaters placed one upon the other, each heater being slightly cupped to contain the liquid.

The thin flexible metallic foil resistance heater may be made of any suitable conducting metal. In order to possess the low specific heat, the heater, however, must be of a thin foil thinner than about 0.01 inch, and preferably having a thickness in the range of 0.001–0.005 inch. Although copper and other conductive foils may be used, it is preferred to use a tough, chemically resistant foil such as stainless steel or other relatively inert alloys. Such foil heaters more readily resist oxidation and the attack of acidic materials or other substances sometimes present in thermoplastic films or in other solids. Chemically inert heaters will also resist degradation products which will sometimes seriously attack reactive metals such as copper at elevated temperatures.

Although as mentioned above the simplest and most practical way to supply the small amount of needed insulation during operation of the jelly-roll calorimeter of the present invention is to cover the jelly-roll or cylinder or stack with a layer of glass wool insulation, the jelly-roll cylinder may, if convenient, be placed in an oven or other insulated enclosure maintained at the temperature at which the specific heat determination is being made. It is convenient to use such an enclosure or oven to bring the jelly-roll to equilibrium at some temperature other than room temperature in order to prepare for a run at other temperatures, particularly at the lower temperatures.

The metallic foil heater will be connected to a source of D.C. electrical power by means of electrical connectors. A.C. could be used but power is easier to measure precisely when using D.C. The connectors may be tabs or an end portion of the foil heater itself, or they may be thin strips of copper serving as buss bars soldered to the foil heater.

I claim:

1. The method of determining the specific heat of a material in the form of a thin layer which comprises placing at least one uniform layer having a known weight per unit area of the material to be tested having a thickness no greater than about 50 mils on at least one flexible thin metallic foil resistance heater of thickness less than about 0.01 inch of known specific heat, density, and thickness, arranging a multiple array of said layers and said heaters wherein said layer and said heater are in physical contact throughout their opposing surfaces, passing electrical current at a known rate through said heater to raise the temperature of said array, measuring the rate of temperature rise in the interior of said array and determining the specific heat, $c$, of the material in said layer by means of the relationship $$c = \frac{\dfrac{Q}{A\left(\dfrac{dT}{dt}\right)} - Dc'l}{\dfrac{W}{a}}$$

wherein $$\frac{Q}{A}$$

is the heat generated per unit area of the heater in B.t.u.'s/hr.-ft.$^2$, $$\frac{dT}{dt}$$

is the rate of rise of temperature in the interior of the array in F.°/hr., $D$ is the density of the heater metal in lbs./ft.$^3$, $c'$ is the specific heat of the heater in B.t.u.'s/lb.-F.°, $l$ is the thickness of the heater in feet, and $$\frac{W}{a}$$

is the weight per unit area of the layer in lbs./ft.$^2$ per unit area of the heater.

2. The method according to claim 1 wherein said heater comprises a stainless steel heater.

3. The method according to claim 1 wherein said layer comprises a homogeneous film.

4. The method of determining the specific heat of a solid in the form of a flexible thin layer which comprises placing a uniform layer having a known weight per unit area of the solid to be tested having a thickness no greater than about 50 mils on a flexible thin metallic foil resistance heater of thickness less than about 0.01 inch of known specific heat, density, and thickness, rolling up the layer and heater to form a roll wherein said layer and said heater are in physical contact throughout their opposing surfaces, passing electrical current at a known rate through said heater to raise the temperature of said roll, measuring the rate of temperature rise in the interior of said roll, and determining the specific heat, $c$, of the solid in said layer by means of the relationship $$c = \frac{\dfrac{Q}{A\left(\dfrac{dT}{dt}\right)} - Dc'l}{\dfrac{W}{a}}$$

wherein $$\frac{Q}{A}$$

is the heat generated per unit area of the heater in B.t.u.'s/hr.-ft.$^2$, $$\frac{dT}{dt}$$

is the rate of rise of temperature in the interior of the roll in F.°/hr., $D$ is the density of the heater metal in lbs./ft.$^3$, $c'$ is the specific heat of the heater in B.t.u.'s/lb.-F.°, $l$ is the thickness of the heater in feet, and $$\frac{W}{a}$$

is the weight per unit area of the layer in lbs./ft.$^2$.

5. A calorimeter for determining the specific heat of a material in the form of a thin layer, said calorimeter comprising alternate layers of (1) the material to be tested in a thickness no greater than about 50 mils and (2) a flexible thin metallic foil resistance heater of thickness less than about 0.01 inch, the heater enclosing the layers of the material to be tested, electrical connections on the heater for connecting power-carrying leads to the heater, and temperature sensing means positioned in the interior of the calorimeter whereby there may be determined the rate of temperature rise of a layer of material to be tested.

6. A calorimeter according to claim 5 wherein said foil resistance heater comprises stainless steel.

7. A calorimeter according to claim 5 wherein said material to be tested comprises a thin homogeneous film.

8. A calorimeter according to claim 5 wherein said temperature sensing means comprises a thermocouple.

References Cited by the Examiner

UNITED STATES PATENTS 3,045,473   7/1962   Hager _____ 73—15

RICHARD C. QUEISSER, *Primary Examiner.*

DAVID SCHONBERG, *Examiner.*

UNITED STATES PATENT OFFICE

CERTIFICATE OF CORRECTION

Patent No. 3,217,537            November 16, 1965

Nathaniel E. Hager, Jr.

It is hereby certified that error appears in the above numbered patent requiring correction and that the said Letters Patent should read as corrected below.

Column 1, line 62, after "lies" insert -- somewhere --; column 2, lines 26 to 31, for that portion of the formula reading $\dfrac{W}{w}$ read $\dfrac{W}{a}$ column 3, line 12, for "proble" read -- probe --; column 4, line 29, for "temperature" read -- temperatures --.

Signed and sealed this 16th day of August 1966.

(SEAL)

Attest:

ERNEST W. SWIDER            EDWARD J. BRENNER
Attesting Officer            Commissioner of Patents